C. B. TRESCOTT.
PROCESS OF RETAINING THE JUICES IN LOW TEMPERATURE COOKED MEATS.
APPLICATION FILED OCT. 15, 1917.
1,256,955. Patented Feb. 19, 1918.
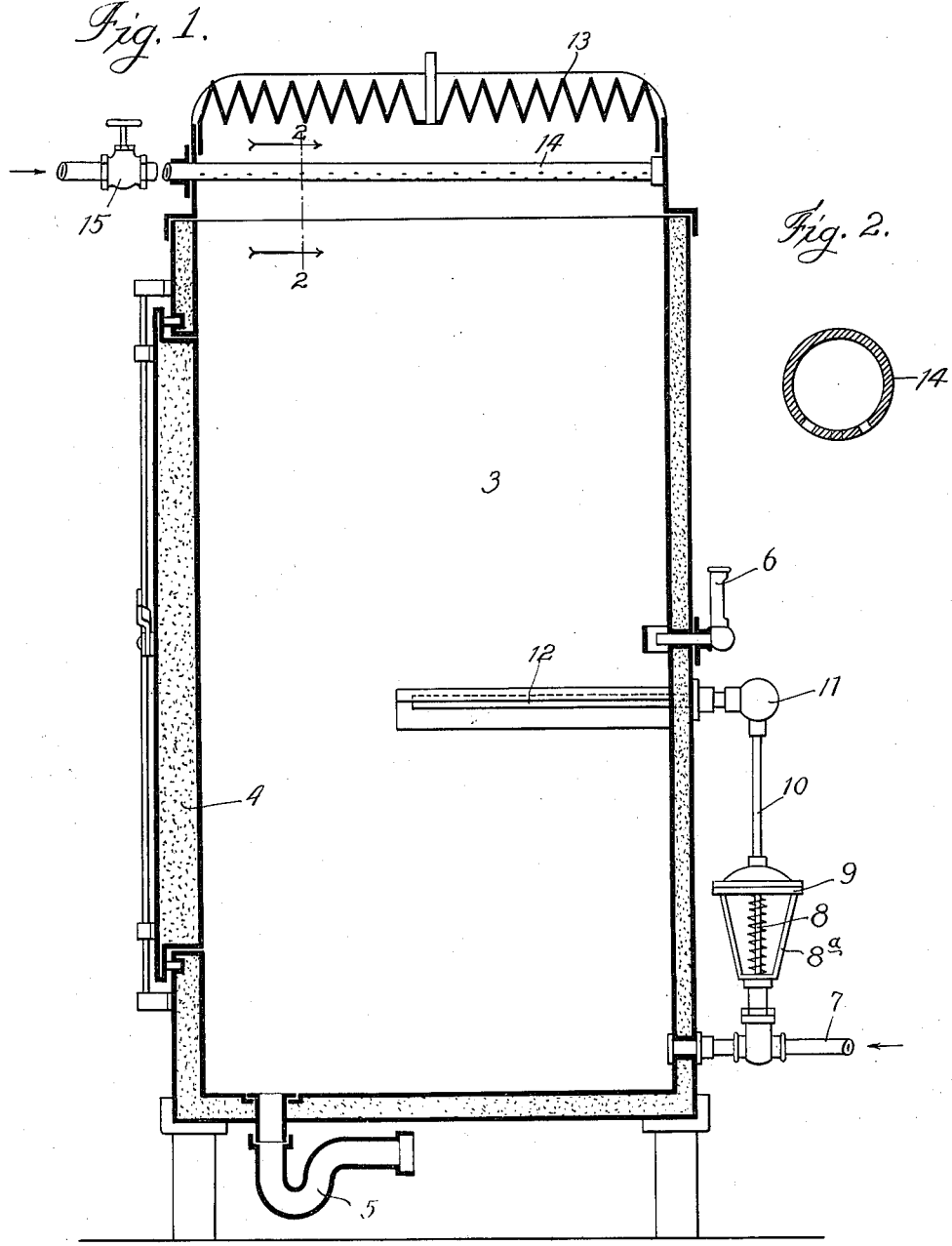

UNITED STATES PATENT OFFICE.

CHARLES B. TRESCOTT, OF CHICAGO, ILLINOIS.

PROCESS OF RETAINING THE JUICES IN LOW-TEMPERATURE-COOKED MEATS.

1,256,955.          Specification of Letters Patent.     Patented Feb. 19, 1918.

Application filed October 15, 1917. Serial No. 196,622.

*To all whom it may concern:*

Be it known that I, CHARLES B. TRESCOTT, a citizen of the United States, residing at Chicago, in the county of Cook and State of Illinois, have invented a new and useful Improvement in Processes of Retaining the Juices in Low-Temperature-Cooked Meats, of which the following is a specification.

In any process of low-temperature cooking practised on meat, such as hams, sausage meat in gut casings or not, tongue, corned beef, and the like, the cooked meat in the cooking chamber is hot. In that condition the juices are very thin and fluid, and disturbing the meat for necessary handling thereof unavoidably starts the juices to run thereby incurring very material loss. This is found to be the case in the practice of my process of low-temperature cooking set forth in United States Letters Patent, No. 1,226,147, dated May 15, 1917, whereby meats are cooked uniformly, with the minimum sacrifice of flavor, nutritious properties and juices, by heat which should not exceed about 180° F., the most desirable temperature in the cooking-chamber for hams being 135° to 140° F. In fact, and particularly in handling hams, thus cooked, in the hot condition, the loss of juices is considerable, and may amount to as much as two per cent. in merely removing the hot hams from the cooking-chamber and carting them away, as to a cooling-chamber, or to a point where they are sprinkled with cold water.

The object of my present invention is to reduce this loss of juices to the minimum, by sprinkling with cooling water the hot cooked meat before removing it from the cooking chamber, wherein it is customary to have each ham inclosed in a hollow sheet-metal cylindrical shaper with cloth-covered ends, though then the temperature in the chamber should be higher than 140° F. and may be as high as about 150° F.

For the purpose of illustration, I have selected the low-temperature cooking apparatus of my Patent No. 1,233,000, dated July 10, 1917; though my present invention is useful as an adjunct to the low-temperature cooking of meat by any desirable process in any suitable apparatus.

In the accompanying drawing, Figure 1 is a vertical sectional view of apparatus suitable for the practice of my present invention, and Fig. 2 is an enlarged section on line 2—2, Fig. 1.

The cooking chamber 3, having hollow sheet-metal side and bottom walls filled with insulating material, is supported on legs and provided with a double-walled and similarly insulated hinged door 4. A drain-pipe 5 leads from the bottom of the chamber, which is equipped with a thermometer 6 and is supplied with live-steam through a pipe 7. The valve in this pipe is on a spring-raised stem 8 confined between the lower end of a frame 8ᵃ and a covered diaphragm 9, to which leads a pipe 10 from a chamber 11 for holding ether, or the like, and communicating with a shielded thermostatic tube 12 extending horizontally into the cooking chamber through its adjacent wall. The thermostat-device automatically operates the valve to control the supply of steam to the cooking chamber for regulating the temperature therein. A vented crown or cover 13, of thin corrugated sheet-metal, surmounts the chamber 3 and serves to rapidly radiate heat from the latter to insure condensation of the steam rising in the chamber to a fog for moistening the air therein and causing the heat carried by the moistened air to permeate the meat (as hams, in the sheet-metal shapers, referred to, spacedly piled in the cooking chamber, but not shown).

A sprinkler, shown as a numerously perforated pipe 14, extends through the dome or cover 13 and is connected with a cold-water supply, such as a hydrant (not shown), the pipe containing a shut-off valve 15.

When, say, hams have been cooked in the cooking-chamber, and while they are still in hot condition therein, the steam being shut off, the valve 15 is opened to gently sprinkle, or spray, cold water downwardly over them, the finely divided streams of water taking up their heat and constantly flowing out of the chamber at the waste-pipe 5. Thus cooling the hams before removing them, by sprinkling with cold water, has the effect of thickening or setting the juices, so that when the hams are subjected to subsequent necessary handling, they retain most, if not all, of their juices, because thickened, thereby saving them from the loss that would inevitably have ensued had the hams been disturbed prior to cooling them.

The juices in meats cooled by thus sprinkling them while hot in the cooking-chamber and before removing them therefrom, become thickened and set at a temperature of about 55° to 60° F.; and it should require about one to two hours to properly so treat a "cooking" or batch of about 1000 pounds of hams in a low-temperature cooker, depending on the temperature of the cooling water.

I claim:—

1. Preventing loss of juices from hot low-temperature-cooked meat, by cooling said meat while in its hot condition and prior to disturbing its position in the cooking-chamber.

2. Preventing loss of juices from hot-low-temperature-cooked meat, by subjecting the meat while in its hot condition and prior to disturbing its position in the cooking-chamber to air saturated with cooling water.

3. Preventing loss of juices from hot low-temperature-cooked meat, by subjecting the meat while in its hot condition and prior to disturbing its position in the cooking-chamber to the cooling action of water showered upon it through the air in said chamber.

CHARLES B. TRESCOTT.